United States Patent [19]

Joshi et al.

[11] 4,434,216

[45] Feb. 28, 1984

[54] SOLID STATE ELECTROLYTE

[75] Inventors: Ashok V. Joshi, Fishkill; Arun D. Jatkar, Goshen, both of N.Y.; William P. Sholette, Warminister, Pa.

[73] Assignee: Rayovac Corporation, Madison, Wis.

[21] Appl. No.: 327,884

[22] Filed: Dec. 7, 1981

Related U.S. Application Data

[63] Continuation of Ser. No. 200,278, Oct. 24, 1980, abandoned.

[51] Int. Cl.$^3$ ............................................. H01M 6/18
[52] U.S. Cl. .................................... 429/191; 429/199; 252/62.2
[58] Field of Search ....................... 429/191, 199, 193; 252/62.2; 423/311

[56] References Cited

U.S. PATENT DOCUMENTS 3,837,920  9/1974  Liang ................................. 429/191

Primary Examiner—Charles F. LeFevour
Attorney, Agent, or Firm—Kenyon & Kenyon

[57] ABSTRACT

An electrolyte for solid-state electrochemical cell comprising in solid state, a combination of lithium, phosphate and iodide and either calcium or aluminum moieties, the non-metallic moieties being in stoichiometric relationship with the metallic moieties. An advantageous electrolyte is prepared by reacting calcium iodide and lithium orthophosphate.

13 Claims, No Drawings

SOLID STATE ELECTROLYTE

This is a continuation of application Ser. No. 200,278, filed Oct. 24, 1980, now abandoned.

The present invention is concerned with solid state electrolytes suitable for use in solid state electrochemical cells having lithium anodes and operating, at least in part through lithium ion transport in the electrolyte.

BACKGROUND OF THE ART AND PROBLEM

The present invention is concerned with that aspect of the electrochemical field related to solid state electrochemical cells employing lithium metal (or alloy) anodes. In a solid state electrochemical cell the utility of the cell with a given cathode and anode is greatly influenced by the characteristics of the electrolyte. A suitable electrolyte must be an electronic insulator and an electrolytic conductor. The greater the electrolytic conductivity of the electrolyte, all other factors being equal, the greater is the allowable current drain from the cell and the less is the internal resistance of the cell. By the present invention there are provided novel solid state electrolytes having high electrolytic conductivity as well as high electronic resistivity.

DISCOVERY AND OBJECTS

It has now been discovered that by means of a combination of lithium, phosphate and iodide moieties and either calcium or aluminum or both moieties a novel, highly advantageous solid state electrolyte can be provided.

It is an object of the invention to provide a novel, solid state electrolyte.

Another object of the invention is to provide a novel process for producing the novel solid state electrolytes of the present invention.

A still further object of the present invention is to provide novel, solid state, electrochemical cells including the novel electrolytes of the present invention.

Other objects and advantages will become apparent from the following description.

GENERAL DESCRIPTION OF THE INVENTION

The solid state electrolytes of the present invention include as essential ingredients the lithium, phosphate and iodide moieties and either the calcium or aluminum or both moieties in stoichiometric relationship metallic to non-metallic moieties. The term "moieties" is used as being generic to "atoms" and "radicals" and any combination of "atoms" or "radicals". The term "solid state" is employed in the sense that the electrolyte, as a whole, has a stable shape and volume at ambient temperatures at which the cell is used. The use of the term "solid state" does not imply the total absence of any phase or phases in the electrolyte composition which might be technically describable as liquid or pasty at the temperature of use of the electrolyte. The electrolytes are in the form of an interdiffused body (or compressed mass) of chemical compounds (or the elements) which are the sources of said moieties.

In addition to the aforelisted moieties the electrolytes of the present invention can contain the oxygen moiety associated initially in the mode of manufacture of the electrolyte, with the aluminum moiety as $Al_2O_3$.

The electrolyte compositions of the present invention contain, in mole percent, about 10% to about 50% of iodine moiety, about 8% to about 47% of lithium moiety, about 3% to about 16% of phosphate moiety, up to about 38% of oxygen moiety (on an atom basis and not combined in the phosphate radical) and about 5% to about 30% of one or more moiety selected from the group of calcium and aluminum moieties, the metallic and non-metallic moieties being in stoichiometric balance. More simply stated from the preferred aspect of manufacturing, the alumina-free electrolytes of the invention can be made up with about 20 to about 55 mole percent of lithium orthophosphate with the balance being at least one member of the group consisting of calcium iodide and aluminum iodide.

When alumina is included in the composition, it can be present in amounts up to about 60 mole percent. For purposes of the foregoing specified ranges, the aluminum moiety is treated as a single entity even though, it is likely that in compositions made with aluminum iodide and alumina, the aluminum is divided among the species aluminum phosphate, aluminum oxide and perhaps other aluminum-containing phases.

The solid electrolytes of the present invention are made by dry blending powders of lithium orthophosphate, calcium iodide or aluminum iodide or both and, if desired, one or more of aluminum oxide and lithium iodide. The dry blended powder is then heated to cause interdiffusion or reaction between or among the ingredients (usually at a temperature above the melting point of the lowest melting of the ingredients) for a period of time of about 0.25 to about 3 or more hours. The thus reacted material is then cooled and ground to a powder and pressed to electrolytic shape. All operations starting from blending dried powders are generally carried out in an inert dry atmosphere. Those skilled in the art will appreciate that the composition of the final electrolyte will not necessarily be the same as that of the initial ingredients. For exmple, if lithium phosphate (having a lithium ion conductivity of about $10^{-14}$ $(ohm-cm)^{-1}$) and calcium iodide (not a lithium ion conductor) are initial ingredients, the final composition will likely contain not only these ingredients but also calcium orthophosphate and lithium iodide, the formation of which is indicated by the following equation

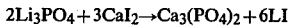

$$2Li_3PO_4 + 3CaI_2 \rightarrow Ca_3(PO_4)_2 + 6LI$$

The actual final composition of the electrolyte will vary depending not only on the proportions of the original reactants but also on the degree of approach to equilibrium permitted by the heating operation described hereinbefore and any side reactions which may occur.

PARTICULAR DESCRIPTION OF THE INVENTION

In practicing the present invention, it is advantageous to employ in the initial powder mixture, in mole percent, about 27% to about 50% of lithium orthophosphate, and about 50% to about 73% of calcium iodide. These proportions of moiety sources produce electrolytes containing, in mole percent, about 25 to about 43% lithium moiety, about 8% to about 14.5% phosphate moiety, about 14 to about 23% calcium moiety and about 28 to about 45% iodine moiety. It is to be noted that if aluminum oxide is to be used in the composition, it is not necessary that this material be present in the original powder mixture. One can, if desired, initially heat a mixture of lithium phophate and calcium iodide cool the heated mixture, grind the heated and cooled mixture to powder and thereafter blend that powder with aluminum oxide and reheat the blend to interdiffuse or interreact the originally heat treated powder with the alumina.

Another advantageous electrolyte of the present invention is made by blending and heating (amounts in mole percent) about 18% to about 50% of lithium phosphate, about 18% to about 50% lithium aluminum iodide, and up to about 60% aluminum oxide. Again, aluminum oxide can be included originally in the powder blend or it can be separately heated with the other pre-reacted (or pre-diffused) ingredients. Furthermore, the blended ingredients can contain lithium iodide in excess of that present in the lithium aluminum iodide composition.

EXAMPLES OF THE INVENTION

In order to give those skilled in the art a greater appreciation of the invention, the following Examples are given.

EXAMPLE I 7.85 parts-by-weight of a dry, powdered calcium iodide was blended with 2.15 parts-by-weight of dry, powdered lithium orthophosphate to give a composition containing, in mole percent, 35.3% of lithium moiety, 11.8% of phosphate moiety, 17.6% calcium moiety and 35.3% iodine moiety. The blended mixture was heated at 800° C. for about ½ hour and ground to a powder. Conductivity of the thus formed electrolyte was about $8 \times 10^{-6}$ (ohm cm)$^{-1}$ at room temperature (25° C.).

EXAMPLE II $Al_2O_3$ powder (grade H51 Alcoa) was blended and ground with a portion of the electrolyte as prepared in Example I and the ground blend was heated for 20 minutes at 500° C. quenched and powdered. The final composition comprised, in mole percent, about 24.5% of lithium moiety, 8.2% of phosphate moiety, 12.2% of calcium moiety, 24.5% of iodine moiety, 12.2% of aluminum moiety and 18.4% of oxygen (on an atom basis) moiety not combined in the phosphate radical. Conductivity of this electrolyte at room temperature was about $2 \times 10^{-5}$ (ohm-cm)$^{-1}$. A 250 mA hr solid state cell was fabricated using this novel electrolyte with lithium as an anode and a mixture of $BiBr_3$, $TiS_2$ and Bi as the cathode. The room temperature open circuit potential of this cell was about 2.6 volts. Upon discharge at 100° C. under a 9.8 kilo ohm external load, the cell exhibited a potential of greater than 2.0 volts after 100 mA hr of discharge.

EXAMPLE III 1.39 parts-by-weight of LiI, 4.21 parts-by-weight of $AlI_3$, 1.2 parts-by-weight of $Li_3PO_4$ and 3.2 parts-by-weight of $Al_2O_3$ were blended, heated at 300° C. for 1 hour then at 500° C. for ½ hour, quenched and powdered, and finally reheated at 800° C. for ½ hour more and again quenched and powdered. The final composition was, in mole percent, 16% of lithium moiety, 4% of phosphate moiety, 16% of iodine moiety, 28% of aluminum moiety and 36% of oxygen (on an atom basis) moiety not combined in the phosphate radical. Conductivity at room temperature was $8.5 \times 10^{-6}$ (ohm-cm)$^{-1}$. The conductivity cell (Li/electrolyte/Li) was kept at 150° C. for several days with no change in conductivity (measured at room temperature), thus indicating stability of the electrolyte to lithium.

EXAMPLE IV

A number of electrolyte compositions made by reacting lithium orthophosphate and calcium iodide were tested for conductivity. These compositions were made by drying lithium phosphate in a vacuum at 120° C. and drying calcium iodide at a sequence of temperatures, the last being 150° C. in a vacuum. Appropriate quantities of these dried materials were ground together for two hours. The ground mixtures were then fired in alumina crucibles at 900° C. for 1 to 2 hours. After firing and cooling the resultant masses were crushed, ground to fine powders capable of passing 100% through sieves having openings of about 0.044 mm and pressed to thin tablet form. Conductivities were measured on these pressed tablets between two lithium electrodes at 29° C. The following Table sets forth the results.

TABLE

| Mole % of $CaI_2$ in $CaI_2$—$Li_3PO_4$ mixture | Conductivity (ohm-cm)$^{-1}$ | |
|---|---|---|
| | Minimum | Maximum |
| 40 | $1.25 \times 10^{-7}$ | $2.3 \times 10^{-7}$ |
| 50 | $9.6 \times 10^{-7}$ | $2.3 \times 10^{-6}$ |
| 55 | $2.6 \times 10^{-6}$ | $3 \times 10^{-6}$ |
| 60 | $4.3 \times 10^{-6}$ | $5.4 \times 10^{-6}$ |
| 65 | $6.2 \times 10^{-6}$ | $6.3 \times 10^{-6}$ |
| 70 | $1.9 \times 10^{-6}$ | $2.2 \times 10^{-6}$ |
| 80 | $6.6 \times 10^{-7}$ | $8 \times 10^{-7}$ |

The foregoing Table shows that in the range of about 45 to about 80 mole percent of $CaI_2$ and 20 to about 55 mole percent of $Li_3PO_4$ in binary mixtures employed in making the electrolytes of the present invention, the room temperature conductivities exceed about $5 \times 10^{-7}$ (ohm-cm)$^{-1}$. An even more advantageous range of $CaI_2$ in these binary mixtures to give room temperature conductivities greater than about $1.5 \times 10^{-6}$ (ohm-cm)$^{-1}$ is about 50 to about 70 or 73 mole percent. Maximum conductivities were obtained at about 65 mole percent of $CaI_2$, that is, in mole percentages of electrolyte, about 31.3% of lithium moiety, about 10.4% of phosphate moiety, about 19.4% of calcium moiety and about 38.8% of iodine moiety.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A solid state electrolyte for use in a solid-state electrochemical cell having a lithium anode comprised in mole percent of about 10 to about 50% iodine moiety, about 8 to about 47% lithium moiety, about 3% to about 16% phosphate moiety, up to about 38% oxygen moiety not inclusive of oxygen contained in the phosphate radical and about 5 to about 30% of at least one moiety selected from the group of calcium and aluminum moieties, said electrolyte being in the form of an interdiffused body of sources of said moieties and said moieties being in stoichiometric relationship metallic to non-metallic.

2. A solid-state electrolyte as in claim 1 which the moiety from the group of calcium and aluminum is calcium and the source of said moiety is calcium iodide.

3. A solid-state electrolyte as in claim 1 in which the moiety from the group of calcium and aluminum is aluminum and the source of said moiety is lithium aluminum iodide.

4. A solid-state electrolyte as in claim 1 which consists of, in mole percentages, about 25% to 43% lithium moiety, about 8% to 14.5% phosphate moiety, about 14% to 23% calcium moiety and about 28% to about 45% iodine moiety.

5. A solid-state electrolyte as in claim 4 which consists, in mole percent, of about 31.3% lithium moiety, about 10.4% phosphate moiety, about 19.4% calcium moiety and about 38.8% iodine moiety.

6. A solid state electrolyte as in claim 4 containing some in situ produced calcium orthophosphate formed in accordance with the relationship

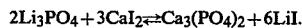

$$2Li_3PO_4 + 3CaI_2 \rightleftharpoons Ca_3(PO_4)_2 + 6LiI.$$

7. A solid-state electrochemical cell having a lithium anode, a cathode and an electrolyte as defined in claim 1.

8. A process for producing a novel electrolyte for use in solid-state electrochemical cells comprising interdiffusing quantities of lithium orthophosphate, one or both of the group of calcium iodide and aluminum iodide and, optionally, one or more of aluminum oxide and lithium iodide to provide an interdiffused composition containing, in mole percent, about 10% to about 50% iodine moiety, about 8 to about 47% lithium moiety, about 3% to about 16% phosphate moiety, up to about 38% oxygen moiety not inclusive of oxygen contained in the phosphate radical and about 5 to about 30% of at least one moiety selected from the group of calcium and aluminum moieties.

9. A process as in claim 8 wherein calcium iodide and lithium orthophosphate are interdiffused.

10. A process as in claim 9 wherein the resultant interdiffused composition contains, in mole percent, about 25% to 43% lithium moiety, about 8% to 14.5% phosphate moiety, about 14% to 23% calcium moiety and about 28% to about 45% iodine moiety.

11. A process as in claim 8 wherein lithium orthophosphate lithium iodide and aluminum iodide are interdiffused.

12. A process as in claim 8 wherein the interdiffusion takes place at a temperature in excess of the melting point of the lowest melting ingredient but below that temperature at which all ingredients melt for up to about 2 hours.

13. A process as in claim 10 wherein the interdiffused composition contains, in mole percent, about 31.3% lithium moiety, about 10.4% phosphate moiety, about 19.4% calcium moiety and about 38.8% iodine moiety.

* * * * *